US006658057B1

(12) United States Patent
Chen et al.

(10) Patent No.: US 6,658,057 B1
(45) Date of Patent: Dec. 2, 2003

(54) DIGITAL TRANSCODER WITH LOGO INSERTION

(75) Inventors: Xuemin Chen, San Diego, CA (US); Krit Panusopone, San Diego, CA (US); Fan Ling, Santa Clara, CA (US)

(73) Assignee: General Instrument Corporation, Horsham, PA (US)

( * ) Notice: Subject to any disclaimer, the term of this patent is extended or adjusted under 35 U.S.C. 154(b) by 290 days.

(21) Appl. No.: 09/653,620

(22) Filed: Aug. 31, 2000

(51) Int. Cl.[7] ................................................. H04N 7/12
(52) U.S. Cl. ...................................................... 375/240
(58) Field of Search ............................ 345/240, 240.16, 345/240.2, 240.22, 240.23, 240.24, 240.26, 240.28; 348/584, 598, 589, 578; H04N 7/12, 9/74

(56) References Cited

U.S. PATENT DOCUMENTS

| | | | | |
|---|---|---|---|---|
| 6,064,764 A | * | 5/2000 | Bhaskaran et al. | 382/183 |
| 6,188,728 B1 | * | 2/2001 | Hurst | 375/240.16 |
| 6,229,924 B1 | * | 5/2001 | Rhoads et al. | 382/232 |
| 6,329,934 B1 | * | 12/2001 | Bailleul | 341/51 |
| 6,373,530 B1 | * | 4/2002 | Birks et al. | 348/584 |
| 6,373,960 B1 | * | 4/2002 | Conover et al. | 382/100 |

FOREIGN PATENT DOCUMENTS

WO    WO 99/51033    10/1999

OTHER PUBLICATIONS

Fukunaga, Y., et al., "MPEG–4 Video Verification Model," Version 16.0, ISO/IEC JTC1/SC29/WG11, Mar. 2000, pp. 26 and 27.
Gertjan Keesman, et al., "Transcoding of MPEG Bitstreams," Signal Processing: Image Communication, 1996 Elsevier Science B.V., pp. 481–500.

* cited by examiner

Primary Examiner—Nhon Diep
(74) Attorney, Agent, or Firm—Townsend and Townsend and Crew, LLP

(57) ABSTRACT

A method and apparatus are disclosed by which a translucent logo is inserted into the transcoded digital bitstream of an MPEG transcoder without changing the digital nature of the bitstream. Such an MPEG transcoder has cascaded decoding and encoding sections. A translucent logo is generated and is added to the reconstructed video image produced by the decoder section of the MPEG transcoder upstream of the transcoder's encoding section. The encoding section of the transcoder then encodes the bitstream which includes the translucent logo.

30 Claims, 3 Drawing Sheets

DIGITAL TRANSCODER WITH LOGO INSERTION

BACKGROUND OF THE INVENTION

The present invention relates generally to the encoding and decoding of digital data using a transcoder, and more specifically to the insertion of a translucent logo into the encoded data stream.

Translucent logos are typically integrated into a video signals using analog technology. An analog rendering of the translucent logo is used as a foreground and superimposed over a separate analog video image background, and the two images are combined to provide the video image incorporating the translucent logo. If the video image had been digitized, the digital video image had to be converted to an analog signal so that the analog rendering of the translucent logo could be inserted in the foreground. After the insertion of the translucent logo, the analog combination of the video image and the translucent logo was typically digitized for further transmission. This conversion of the video image from digital to analog and back to digital is obviously inefficient, and can result in a loss of picture quality.

A video bitstream digitized, encoded and compressed in accordance with MPEG standards conserves space and memory by re-using video images. Instead of creating the entire video image for each video frame, the MPEG signal instead generates individual sections of the video image once and moves the sections as required from frame to frame using motion vectors (MVs). The video image is typically organized in the form of MacroBlocks (MBs), each of which can be an 8×8 block of pixels. An MPEG transcoder may be used to modify the digital data to change the bit-rate of the encoded signal. An example of such an MPEG transcoder is described in Keesman et al., "Transcoding of MPEG bitstreams", Signal Processing: Image Communications vol 8, pp. 481–500 , 1996. Such a transcoder re-uses the motion vectors without change in the reencoded signal, and minimizes changes to the macroblock mode. No technique has heretofore existed for incorporating a translucent logo directly into the MPEG bitstream.

SUMMARY OF THE INVENTION

The present invention provides a method and apparatus by which a translucent logo is inserted into the transcoded digital bitstream of an MPEG transcoder without changing the digital nature of the bitstream. Such an MPEG transcoder has cascaded decoding and encoding sections for the digital bitstream. In the present invention, the translucent logo is generated and is added to the transcoded bitstream of the MPEG transcoder upstream of the transcoder's encoding section. The encoding section of the transcoder then encodes the bitstream which includes the translucent logo.

In a first embodiment of the present invention, the motion vectors from the original encoded video image are used in the reencoded image which now includes the translucent logo. This method is consistent with normal MPEG transcoder operation in which the transcoder re-uses the motion vectors, and is thus quite efficient. However, re-using the motion vectors intended for sections of the video image now occupied in whole or in part by the translucent logo does not produce a completely stable logo. This embodiment has the advantage of minimal complexity balanced with a slight potential loss in video quality.

A second embodiment of the present invention employs a recalculation of the motion vectors used in the reencoded bitstream. This recalculation is based upon the area of each macroblock taken up by the translucent logo relative to that of the underlying picture. A threshhold value is designated in the second embodiment of the present invention to dictate what percentage of the area of a macroblock can be covered by the translucent logo without changing the motion vector for the macroblock. When the logo coverage in a macroblock is more than the threshhold value, the motion vector for that macroblock is set to zero. If not, then the motion vector for that macroblock remains unchanged from its original value. The second embodiment adds a certain level of complexity to the transcoder function, but may improve video quality over the first embodiment.

The first and second embodiments share the advantage of introducing a transparent logo to the video bitstream as it passes through the MPEG transcoder. The necessity in the prior art of reducing the bitstream to analog, and superimposing an analog translucent logo, is eliminated completely. This yields significant benefits for services which seek to superimpose information on an existing video bitstream, such as a cable television operation which wishes to add information to an existing satellite video feed.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE SPECIFIC EMBODIMENTS

The present invention provides two methods by which a translucent logo can be added to a video image as the video image passes through a transcoder such as an MPEG transcoder. Satellite transmission networks and cable transmission mediums are examples of the transmission channels on which the digital video images may travel. When the video image transitions from one transmission medium to another, for example from a satellite feed to a cable television system, the video image often must be decoded and reencoded to match the bit-rate of the new transmission medium. An MPEG transcoder is a device which receives a version of the video image which has been digitally encoded and compressed according to MPEG standards, and decodes and reencodes the video to match the characteristics of the new transmission medium.

Figure 1:
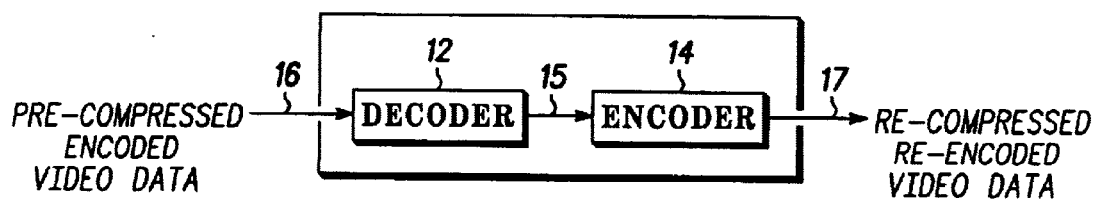
FIG. 1 schematically illustrates a conventional video transcoder system of the prior art.

FIG. 1 provides a simplified block diagram of a conventional MPEG transcoder 10 as described in the Keesman et al. article referenced above. The transcoder 10 includes cascaded (i.e., serially connected) decoding section 12 and encoding section 14. When the video image reaches transcoder 10, it is traveling as an encoded and compressed digital bitstream 16. Transcoder 10 processes the input digital bitstream 16 and transmits a re-encoded and re-compressed bitstream 17 of digital video image data. Transcoder 10 changes the bit-rate of the bitstream to accommodate the different bit-rate capacities of the input and output bitstreams, and acts as a smooth transition for a bitstream from one transmission network to another and thus from one bit-rate to another bit-rate. For example, the first transmission network providing input bitstream 16 may be a high-capacity satellite with a bit-rate of 9 Mbit/s, while the second transmission network which receives output bitstream 17 may be lower-capacity local cable service which feeds into a set-top box decoder having a bit-rate of 5 Mbit/s.

As the compressed and encoded bitstream 16 containing the digital video image information enters transcoder 10, it has a specific bit rate which is dictated by the transmission network on which bitstream 16 is traveling. When input bitstream 16 enters MPEG transcoder 10, it first encounters the decoding section 12 where the compressed and encoded video image information is decoded and decompressed to provide a reconstructed video image 15. The reconstructed video image 15 then passes through the encoding section 14 of transcoder 10 where it is re-encoded and re-compressed to provide the output bitstream 17 at the desired output bit-rate.

Figure 2:
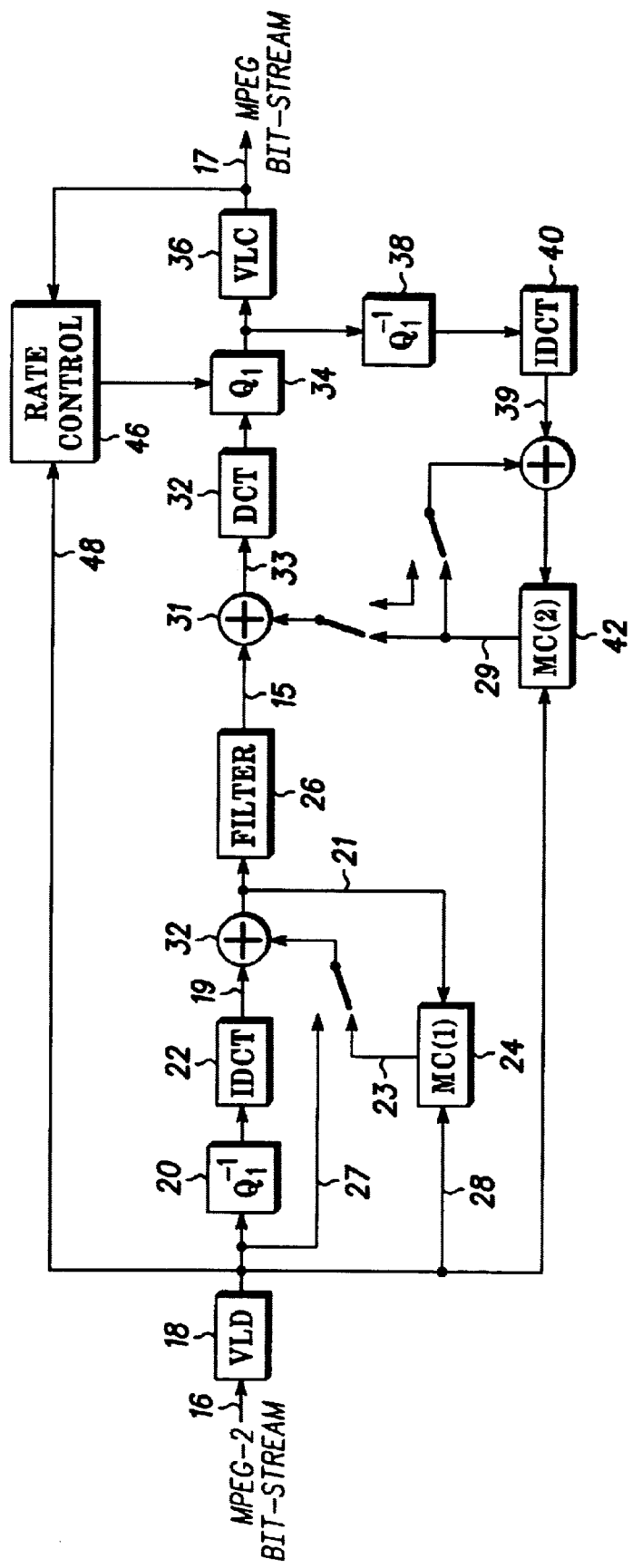
FIG. 2 schematically illustrates the prior art architecture of a conventional MPEG-2 transcoder.

A more detailed illustration of the decoding section 12 and encoding section 14 of transcoder 10 is shown in FIG. 2. The decoding section 12 contains various components which decode the input signal and separate it into components such as coefficients, motion vectors and mode. Decoding section 12 includes a variable length decoder (VLD) 18, a dequantizer (Q^-1) 20, an inverse discreet cosine transform section (IDCT) 22, first motion compensation section (MC(1)) 24, and filter 26.

In order to conserve memory and space, MPEG transcoder 10 re-uses video images from frame to frame. The video information is divided into macroblocks (MBs) which can be 8×8 pixels. Instead of continuously generating very similar video images, the transcoder 10 retains the video image information generated for each macroblock from frame to frame. In order to show motion of these macroblocks, and more specifically the video images which they display, a set of motion vectors are used to direct the video image in the macroblock from frame to frame. In a typical MPEG transcoder, the motion vectors are taken from the input bitstream 16 as illustrated by arrow 28 and reinserted in the output bitstream 17 without change because they are not dependent on the bit-rate.

Variable length decoder 18 decodes the incoming bitstream 16 and transmits the decoded bitstream as a series of quantized coefficients and motion vectors. The MPEG bitstream 16 which enters the variable length decoder 18 has been encoded using Huffman techniques, which means that the coefficients can have variable length. The dequantizer 20 receives the quantized coefficients from variable length decoder 18 and de-quantizes the coefficients (the motion vectors do not enter the dequantizer). The de-quantized coefficients pass through the inverse discreet cosine transform section 22 which processes the coefficients and transmits a residual signal represented by arrow 19 of the video image. The residual signal represents changes in a video frame relative to the previous frame not represented by the motion vectors or mode.

The motion vectors are separated from the rest of the bitstream at the output of variable length decoder 18 and sent to MC(1) 24, as illustrated by arrow 28. The coding mode is also separated from the original bitstream in variable length decoder 18 and forwarded separately from the coefficients and motion vectors, as illustrated by arrow 27. MC(1) 24 also receives the data representing the next previous reconstructed video image as represented by arrow 21. MC(1) 24 modifies the previous video image as directed by the motion vectors, and outputs the "prediction" of the video image as illustrated by arrow 23. This prediction is combined with the residual signal 19 from IDCT 22 at decoder loop 32 and the combined signal passes through filter 26 to provide the reconstructed video image illustrated by arrow 15.

The reconstructed video image 15 enters the encoding section 14 of transcoder 10 where the residual signal of the video image and the motion vectors 28 are re-encoded and recompressed according to the specifications of the desired output bitstream 17. The major components of the encoding section 14 of transcoder 10 will, in combination, re-encode and recompress the bitstream 16 which was decoded and decompressed by the decoding section 12. These major components include discrete cosine transform function (DCT) 32, quantizer (Q) 34, variable length encoder (VLC) 36, dequantizer (Q^-1) 38, inverse discreet cosine transform function (IDCT) 40, and second motion compensation section (MC(2)) 42.

Within the encoding section of the MPEG transcoder, the prediction is first subtracted from the reconstructed image as illustrated by arrow 29 to yield the residual signal of the video image represented by arrow 33. The discrete cosine transform 32 and quantizer 34 work in combination to again transform and quantize the received residual signal. Discreet cosine transform section 32 transforms the residual signal of the video image into a set of corresponding coefficients. These coefficients are then passed through quantizer 34 where they are quantized. The compressed and quantized residual signal is then passed through variable length encoder 36 which reencodes the video signal information.

Dequantizer 38 and IDCT 40 in encoder section 14 take the compressed and quantized residual signal output by IDCT 40 and decompress and de-quantize the residual signal to provide a reconstructed residual picture as depicted by arrow 39. The reconstructed residual picture is transmitted to MC(2) 42, and used to compute the prediction which is subtracted at encoding loop 31.

MPEG transcoder 10 also includes a rate control section 46 which monitors the transcoder input and output to make sure that there is not a bit underflow nor a bit overflow. It is important to maintain an output bit-rate which is relatively stable in order to prevent a disruption or discontinuity in the bitstream 17 comprising the output video image.

Figure 3:
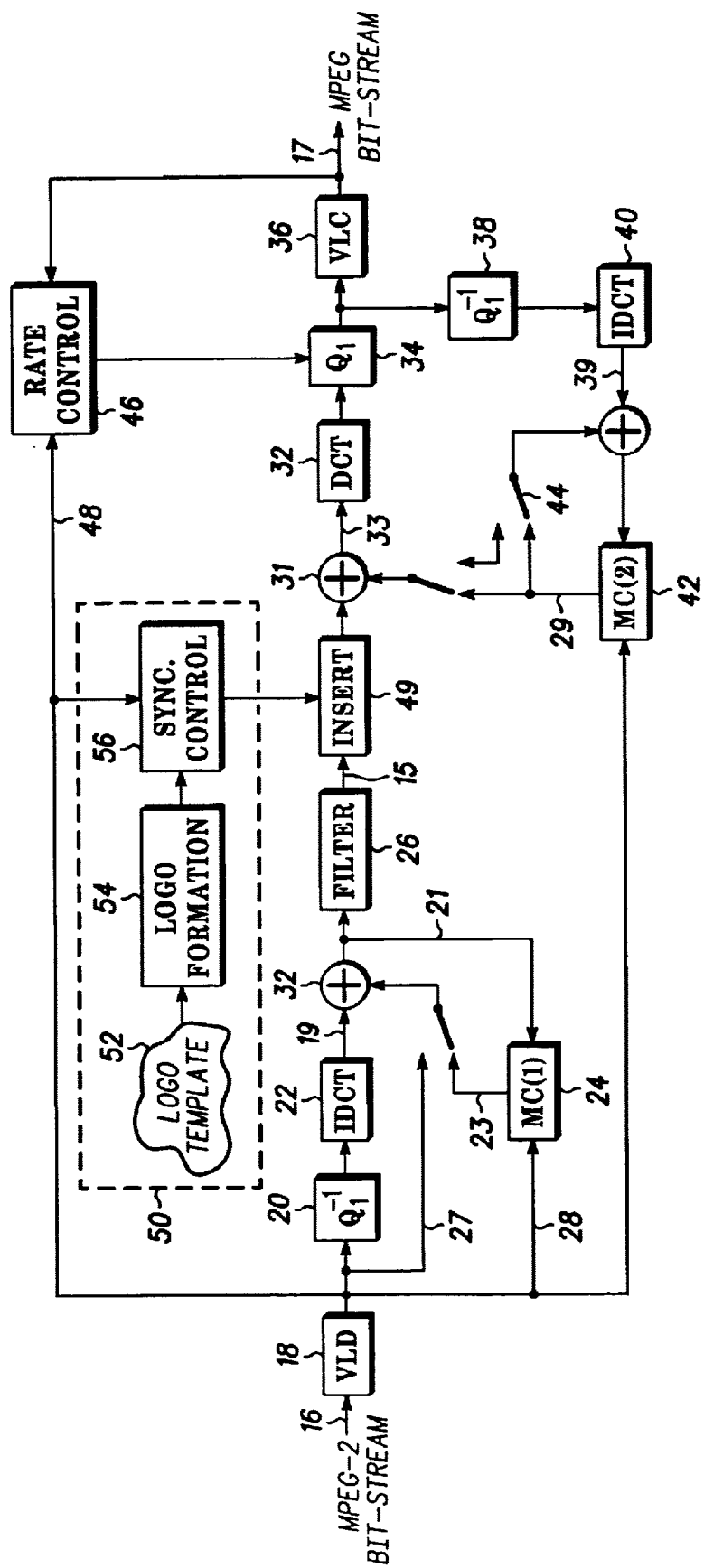
FIG. 3 schematically illustrates the architecture of an MPEG transcoder including the translucent logo insertion section of the present invention.

Both of the specific embodiments of the present invention are illustrated by the architecture depicted in FIG. 3 The MPEG-2 transcoder 48 illustrated in FIG. 3 is very similar to the MPEG transcoder 30 of FIG. 2 and includes all of the same components. Components of MPEG transcoder 48 which are common to prior art MPEG transcoder 30 are given the same reference numbers. In addition, the MPEG transcoder 48 illustrated in FIG. 3 includes a translucent logo insertion section 50.

A logo template 52 constitutes the visual representation of the translucent logo, and logo formation section 54 receives the logo in the form of a matrix l(x,y). The logo formation section 54 utilizes the following equation to generate the translucent logo:

$$\alpha \ (l(x,y)-p(X,Y)),$$

where p(x,y) denotes a pixel value of the original video frame, l(x,y) denotes an pixel value in the original logo, and cc is the composition parameter with $0<\alpha<1$.

Figure 4:
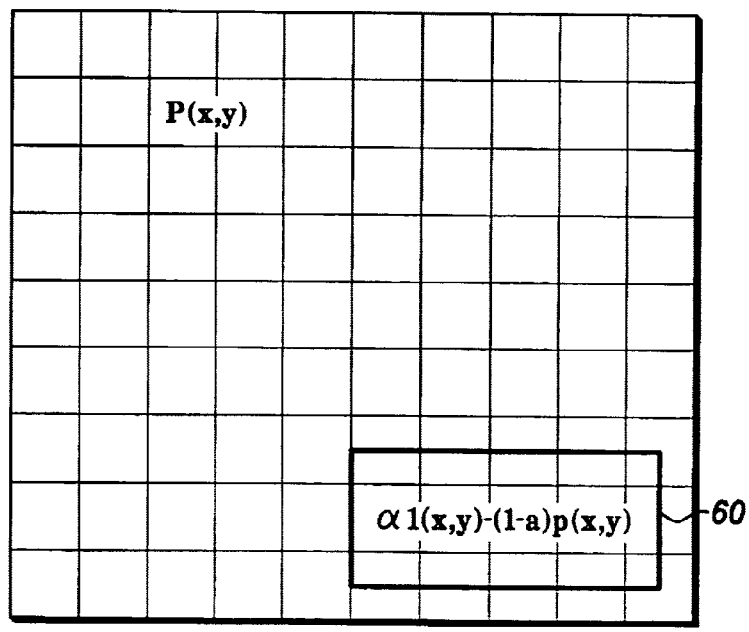
FIG. 4 schematically illustrates the organization of a video frame as used in the present invention.

The development of the composition parameter α is schematically depicted in FIG. 4. Initially, the goal is to have the logo insertion affect as few macroblocks as possible in the underlying picture. Accordingly, a hypothetical box is formed having a height and width which bounds the logo as tightly as possible. For an MPEG-2 transcoder, the box must be rectangular, and to minimize the number of macroblocks affected by the logo, the upper left corner of the box is placed at a macroblock boundary. This alignment is accomplished by rounding down the upper-left pixel location to the nearest multiple of 16.

In an MPEG-4 transcoder, the logo can be an arbitrarily shaped object (VOP), and the bounding box of the VOP is calculated based on the VOP information as discussed in IOS/IEC 14496-2 Committee Draft (MPEG-4), "Information Technology-Coding of Audiovisual Objects: Visual", October, 1997. In order to minimize the number of macroblocks affected by the logo, VOP_horizontal_mc_spatial_ref and VOP_vertical_mc_spatial_ref should be rounded off to the nearest top left multiple of 16.

The synchronization control 56 monitors the insertion of the logo into the bitstream 16 of the reconstructed signal of the video image. Synchronization control 56 matches the generated data for the logo with the reconstructed image. The completed translucent logo is inserted into the reconstructed signal at 49 and becomes part of the reconstructed video signal downstream of the decoding section and upstream of the encoding section.

In the first embodiment of the present invention, the translucent logo is generated by calculating α (l(x,y)−p(x,y)), and the logo is added to the reconstructed video at insert 49. As a result, the reconstructed video incorporates the translucent logo as it enters the encoder section, and the buffer in MC(2) receives the reconstructed video with logo. DCT 32 will encode the video with logo.

The first embodiment of the present invention reuses the motion vectors decoded by VLD 18 from the input bitstream, as in a normal MPEG transcoder. The residuals output by MC(2) will include the logo effect, and thus the coefficients will be modified by encoder section 14 to include the logo. However, the motion vectors will be inaccurate in the area of the picture involving the logo. Also, due to the nature of MPEG encoding, motion vectors pointing to the macroblocks including the logo may have the wrong reference microblock. These factors may impact on the coding efficiency, but these factors may not be significant in practice in certain applications, and may be more than justified by the resulting lack of complexity.

The second embodiment of the present invention also utilizes, the architecture represented in FIG. 3. Unlike the first embodiment, the second embodiment involves a modification of the motion vectors. The extent to which the motion vector for a particular video segment may be modified in the reencoded signal depends on the extent to which the logo occupies that video segment in the second embodiment.

When the translucent logo is inserted into the reconstructed video signal at 49, the logo occupies some of the area of some of the macroblocks of the original video. The composition parameter a is a measurement of the percentage of the macroblock area occupied by the translucent logo relative to that of the original video signal. Each macroblock affected by the insertion of the translucent logo will have a different percentage of its area occupied by the translucent logo, yet the composition parameter, α, for each macroblock will have a single value.

The macroblocks which contain only logo information should have a motion vector of zero, i.e., MV(x,y)=(0,0). This is contrary to the normal operation of an MPEG transcoder, however, which reuses the motion vectors from the input bitstream in encoding the output bitstream. Typically, the motion vectors underlying the original video signal will have motion vectors not equal to zero, but the logo content should remain motionless. In the second embodiment of the present invention, the concept of threshholding is introduced. That is, a selection is made between using a motion vector of zero, or the input motion vector from the original video, depending on whether the logo content of a macroblock exceeds a threshhold value.

The composition parameter α is a measure of the relative contribution of the logo (foreground) and original video (background) to a particular macroblock. To implement the threshholding concept of the second embodiment, α must be set to a desired value between 0 and 1, such as 0.5. The motion vectors for the logo are then calculated in MC(2) as follows:

MV(x,y)=(0,0) when α is greater than or equal to the threshhold value, and

MV(x,y)=MV(x,y) from the original bitstream otherwise.

The changes made to the motion vectors may impact the validity of the coding mode (see arrow 27). Where a macroblock is dominated by the logo, it is inefficient to use a complex coding mode. To keep the complexity of the system low, the forward prediction mode is used for macroblocks dominated by the logo, i.e., when the motion vector is reset to zero. This is in contrast with the first embodiment, where the coding mode (and the motion vectors) were not changed.

In operation, the preferred embodiments of the present invention utilize the features of a standard MPEG encoder. A logo template is provided, and the logo is generated. The logo data is inserted into the reconstructed video signal after its reconstruction by the decoder section of the transcoder. The reconstructed video signal with the logo included is then encoded by the encoder section of the transcoder.

In the first embodiment of the present invention, the motion vectors of the input video signal are reused in the output signal, and the mode is unchanged. In the second embodiment, however, a threshholding concept is used based on the composition parameter to determine whether the motion vector should be zero, if the macroblock is dominated by logo content, or the original value. If zero, the mode is set to forward prediction mode.

While selected embodiments of the present invention have been discussed in detail, it is to be expressly understood that such embodiments are for the purpose of illustration only. Other embodiments will become apparent to those skilled in the art.

What is claimed is:

1. A method of inserting a translucent logo into the transcoded bitstream of a transcoder including an MPEG transcoder having cascaded decoding and encoding sections, the method comprising:

generating a translucent logo by calculating α (l(x,y)−p(x,y)), wherein p(x,y) denotes a pixel value of a video frame, l(x,y) denotes an original pixel value in the translucent logo, and α is the composition parameter and is adjustable between zero and one;

adding the translucent logo to the transcoded bitstream of the MPEG transcoder upstream of the transcoder's encoding section; and encoding the bitstream which includes the translucent logo with the encoding section of the transcoder.

2. The method of claim 1 and additionally comprising the step of creating a hypothetical box with known height and width which tightly bounds the translucent logo.

3. The method of claim 2 wherein the creating step includes creating a hypothetical rectangular box.

4. The method of claim 2 wherein the creating step includes creating a hypothetical box consisting of a video object plane (VOP).

5. The method of claim 2 and additionally comprising the step of aligning the hypothetical box surrounding the translucent logo to the nearest top left macroblock (MB) of the desired logo location in the transcoded bitstream.

6. The method of claim 1 wherein the encoding step includes re-using the motion vectors (MVs) decoded from the input bitstream by the decoding section of the transcoder in the encoding section of the transcoder.

7. The method of claim 6 wherein the transcoder has a first motion compensation function MC(1) in its decoding section and a second motion compensation function MC(2) in its encoding section, wherein MC(2) has a buffer, and wherein the encoding step includes containing the video with the translucent logo in the buffer.

8. The method of claim 7 wherein the encoding step includes correcting the residual from MC(2) which contains the translucent logo effect.

9. The method of claim 6 wherein the encoding step further includes encoding the bitstream which includes the translucent logo using a discreet cosine transform (DCT).

10. The method of claim 1 wherein the bitstream includes encoded motion vectors (MVs), and wherein the encoding step includes compensating for the insertion of the logo in calculating the MVs.

11. The method of claim 10 wherein the transcoder has a first motion compensation function MC(1) in its decoding section and a second motion compensation function MC(2) in its encoding section, and wherein the encoding step further includes subtracting the logo from the bitstream using the reconstruction output from MC(2) after the logo is translucently inserted into the bitstream.

12. The method of claim 10 wherein the encoding step further includes dividing the MVs of the MBs which are affected by the insertion of the translucent logo into two categories.

13. The method of claim 12 wherein the dividing step further includes designating a threshhold value for the ratio of the coverage area of the inserted logo relative to that of the video, and wherein the encoding step includes setting the MVs of the MBs to zero for the MBs for which the percentage of the MB area covered by the translucent logo is higher than the designated threshhold value.

14. The method of claim 13 wherein the encoding step further includes maintaining the value of the MVs of the MBs for which the percentage of the MB area covered by the translucent logo is lower than a designated threshhold value.

15. The method of claim 14 wherein the transcoded bitstream includes mode information, and wherein the encoding step further includes setting the mode to forward prediction mode when the percentage of the MB area covered by the translucent logo is higher than the designated threshhold value.

16. A method of inserting a translucent logo into the transcoded bitstream of an MPEG transcoder having cascaded decoding and encoding sections, said bitstream including motion vectors (MVs), the method comprising:

generating a translucent logo by calculating $\alpha$ ($l(x,y)-p(x,y)$), wherein $p(x,y)$ denotes a pixel value of a video frame, $l(x,y)$ denotes an original pixel value in the translucent logo, and a is the composition parameter and is adjustable between zero and one;

adding the translucent logo to the transcoded bitstream of the MPEG transcoder upstream of the transcoder's encoding section;

compensating for the insertion of the logo in calculating the MVs; and encoding the bitstream which includes the translucent logo.

17. The method of claim 16 and additionally comprising the step of creating a hypothetical box with known height and width which tightly bounds the translucent logo.

18. The method of claim 16 additionally comprising the step of aligning the hypothetical box surrounding the translucent logo to the nearest top left macroblock (MB) of the desired logo location of the compressed video bitstream.

19. The method of claim 16 wherein the MPEG transcoder has a first motion compensation function MC(1) in its decoding section and a second motion compensation function MC(2) in its encoding section, wherein MC(2) has a buffer, and wherein the encoding step includes containing the video with the translucent logo in the buffer.

20. The method of claim 16 wherein the encoding step further includes encoding the bitstream which includes the translucent logo using a discreet cosine transform (DCT).

21. A method of inserting a translucent logo into the transcoded bitstream of an MPEG transcoder having cascaded decoding and encoding sections, said bitstream including motion vectors (MVs), the method comprising:

generating a translucent logo by calculating $\alpha$ ($l(x,y)-p(x,y)$), wherein $p(x,y)$ denotes a pixel value of the video frame, $l(x,y)$ denotes an original pixel value in the logo, and $\alpha$ is the composition parameter and is adjustable between zero and one;

adding the translucent logo to the transcoded bitstream of the MPEG transcoder upstream of the transcoder's encoding section;

compensating for the insertion of the logo in calculating the MVs; and encoding the bitstream which includes the translucent logo.

22. The method of claim 21 wherein said transcoder has a first motion compensation function MC(1) in its decoding section and a second motion compensation function MC(2) in its encoding section, and wherein the compensating step includes subtracting the logo from the MPEG bitstream by the reconstruction output from MC(2).

23. The method of claim 21 and additionally comprising the step of creating a hypothetical box with known height and width which tightly bounds the translucent logo.

24. The method of claim 21 and additionally comprising the step of aligning the hypothetical box surrounding the translucent logo to the nearest top left macroblock (MB) of the desired logo location on the compressed video bitstream.

25. The method of claim 21 additionally comprising the step of dividing the MVs of the MBs which are affected by the insertion of the translucent logo into two categories.

26. The method of claim 25 wherein the dividing step further includes designating a threshhold value for the ratio of the coverage area of the inserted logo relative to that of the video, and wherein the encoding step includes setting the MVs of the MBs to zero for the MBs for which the percentage of the MB area covered by the translucent logo is higher than the designated threshhold value.

27. The method of claim 21 wherein the decoding step further includes maintaining the value of the MVs of the MBs for which the percentage of the MB area covered by the translucent logo is lower than a designated threshhold value.

28. The method of claim 21 wherein the transcoded bitstream includes mode information, and wherein the encoding step further includes setting the mode to forward prediction mode when the percentage of the MB area covered by the translucent logo is higher than the designated threshhold value.

29. A transcoder including an MPEG transcoder for a video bitstream comprising:
- a decoder section which includes a variable length decoder which decodes the video bitstream into coefficients and motion vectors (MVs) and reconstructs the video image from the decoded video bitstream;
- a logo formation section which form a translucent logo and inserts said logo into the reconstructed video image; and
- an encoder section which encodes the reconstructed video image including the translucent logo;

wherein the reconstructed video signal is organized into macroblocks (MBs), and wherein the encoder section compares the logo content to original video content of each MB and uses the MV from the original video bitstream if the comparison shows dominance of the original video content over the logo content, and wherein the encoder section sets the MV equal to zero if the comparison shows dominance of the logo content over the original video content.

30. The transcoder of claim 29 in which the encoder section uses the MVs from the decoder section without change.

* * * * *